Dec. 9, 1952 A. HOLT 2,620,603
MACHINE FOR CLEANING EGGS, FRUIT, AND THE LIKE
Filed May 3, 1950 2 SHEETS—SHEET 1

Inventor
Alfred Holt
By
Young, Emery & Thompson
Attys.

Dec. 9, 1952 — A. HOLT — 2,620,603
MACHINE FOR CLEANING EGGS, FRUIT, AND THE LIKE
Filed May 3, 1950 — 2 SHEETS—SHEET 2

Inventor
Alfred Holt
By
Young, Emery & Thompson
Attys.

Patented Dec. 9, 1952

2,620,603

UNITED STATES PATENT OFFICE 2,620,603

MACHINE FOR CLEANING EGGS, FRUIT, AND THE LIKE

Alfred Holt, Epsom, Auckland, New Zealand

Application May 3, 1950, Serial No. 159,850
In Great Britain August 7, 1949

4 Claims. (Cl. 51—164)

This invention has been devised with the object of providing a new construction of machine for use, more particularly by farmers for the cleaning of eggs, fruit, vegetables or the like, in preparing them for the market.

The machine designed is adapted in its operation to deal with a number of eggs, fruit or the like at one time, which number may vary in correspondence with the size in which the machine is made, and to effect the cleaning by a washing action in water, or in other liquid or in a suitable dry material.

The invention hereinafter is relatively employed to describe the cleaning of eggs.

In the general features of its construction, the invention comprises a horizontally disposed cylindrical drum made with a closed or perforated periphery and with a central opening at one or at both ends, and a trough within which the cylinder is mounted to extend and to rotate, which trough is made of a depth such that the lower part only of the cylinder is located as the cylinder rotates. The eggs to be cleaned, or washed, are placed within the drum through the end opening or openings, to rest in the lower part thereof and the drum is rotated so that the eggs are caused to roll over and over in the cylinder.

The invention also relates to the detail of construction of the machine and to the means whereby the required rotation may be imparted to the drum or cylinder.

In more fully describing the invention, reference will hereinafter be made to the accompanying sheets of drawings, in which.

Figure 1:
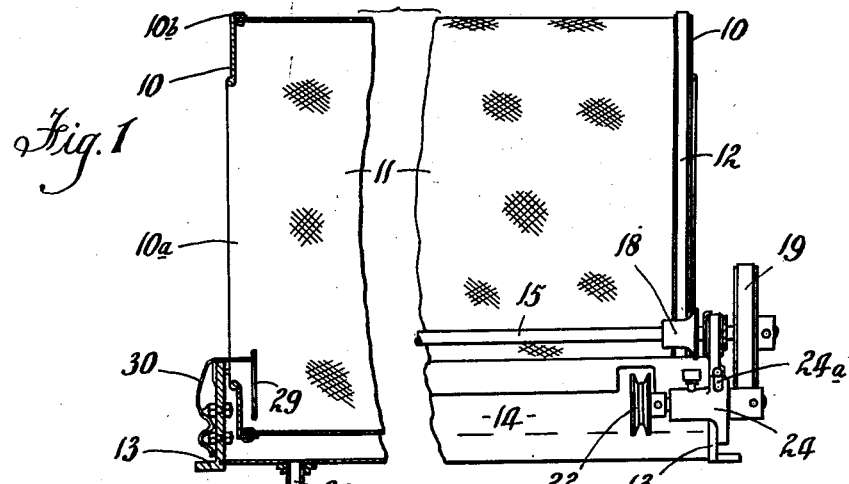
Figure 1 is a side view of the machine, shown broken in its length, with the left hand portion being in vertical section.
Figure 2:
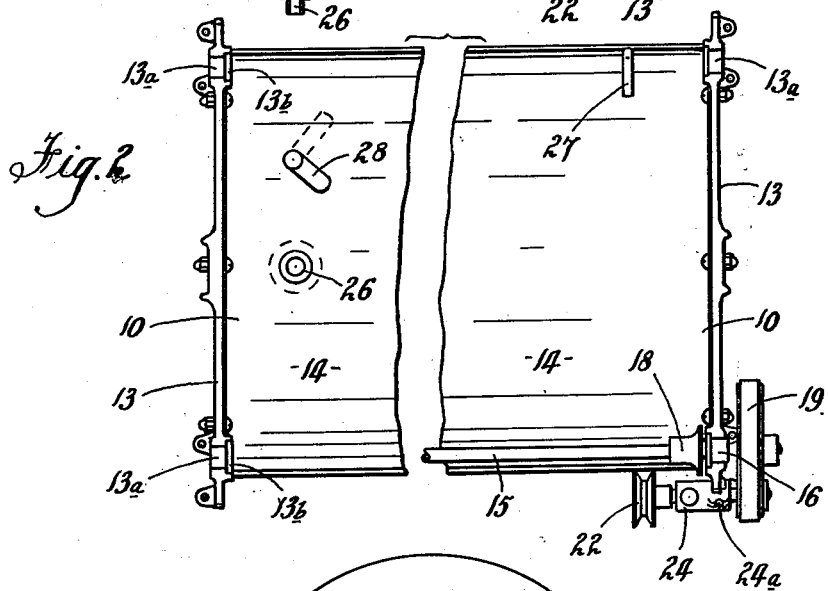
Figure 2 is a plan view, broken in its length, with the drum and the upper illustrated driving means removed, the lower left hand portion of the drive spindle and its bearing also not shown.

The drum is made up of two circular end plates 10 each formed with a central circular aperture 10a and each formed with an inwardly projecting flange 10b at its peripheral edge, and with a peripheral cylindrical wall 11 of suitably strong and perforated material, as perforated sheeting, gauze, metal sheeting or the like, extending between the two ends. Each end flange is surrounded by a cushioning frictional gripping material 12, as rubber, cork or the like.

Figure 3:
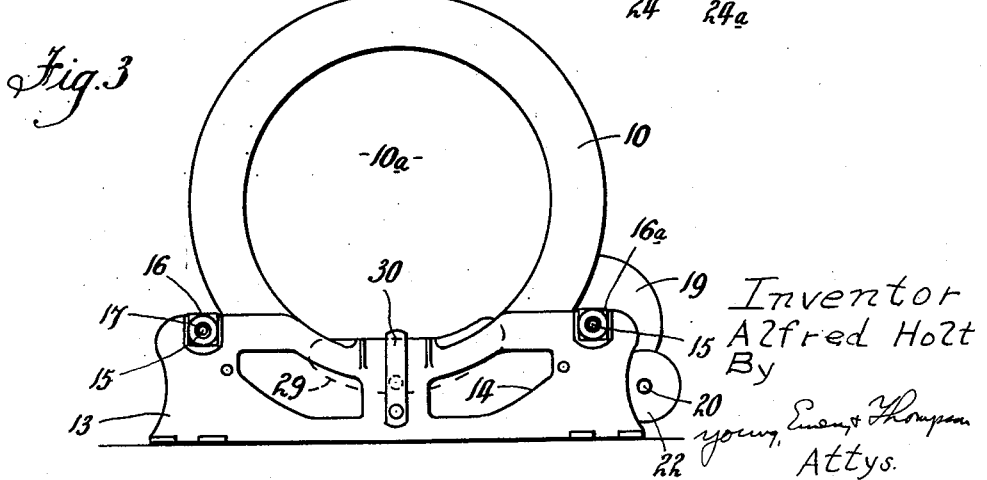
Figure 3 is a left hand end view on above figures.
Figure 4:
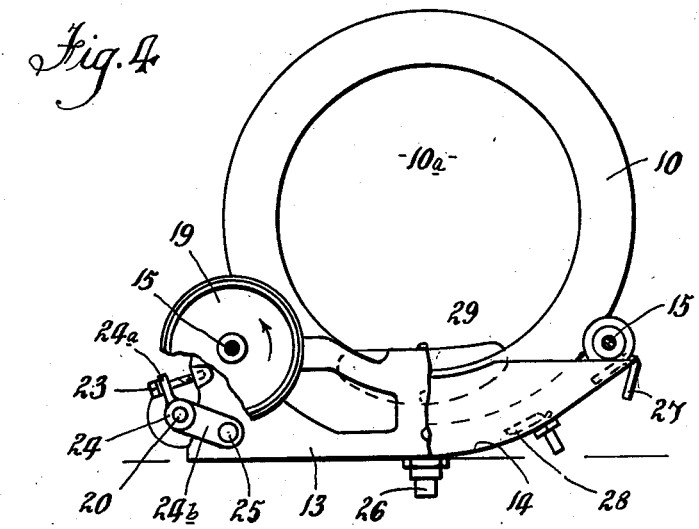
Figure 4 is a right hand end view on Figures 1 and 2, and illustrating the drive means which are shown partially broken to illustrate an adjustment means later referred to, Figure 5 is a detail side view of the drive means.

If desired, though, the opening 10a at one end of the drum may be covered by perforated material as indicated in Figure 3.

The trough is formed with ends 13 made to constitute stands by which the machine's base is made up, and a transversely curved bottom 14 extending between the ends, the curve in which is formed in conformity with the diameter of the drum but slightly larger. A spindle 15 is arranged to extend alongside each edge of the trough such spindle being journalled in bearings seated in recesses 13a formed in the trough end. Each bearing consists of a fluted rubber bush 16 disposed over a brass or like bearing 17 which bush is formed integral with a flat plate 16a. This plate is fitted between locating faces 13b at the rear of the recess 13a when the fluted bush of the bearing is seated within the recess. The projecting outer end of the spindle 15 journalled within the bearing has an encircling spring clip to retain the spindle in correct position or for the quick removal thereof from the bearing.

On each end of each spindle 15 a friction roller 18 is fixed and these rollers serve to support the drum 11 on the trough 14 by causing the flange 10b of the drum ends to rest thereon. Each roller 18 is formed with a flanged end 18a to serve as a riding guide for the respective engaging flange of the drum. The main surface of the rollers may also be ribbed to ensure a positive frictional drive of the drum therewith. The drum may thus rotate on these rollers and by reason of the cushioning nature of the engagement between the flanges and the rollers provided by the material 12, its rotation will be without shock or jar.

The rotation is imparted to the drum by making one of the spindles a power driven spindle, for which purpose at one end of its ends it has a rubber tyred wheel 19 mounted thereon. A short shaft 20 is journalled in a bearing in the corresponding trough end and on this a frictional surfaced wheel such as the knurled fibre roller 21 is mounted to engage the wheel 19 upon the spindle. Rotation may be imparted to this shaft by any approved means operated by hand or power drive.

Figure 5:
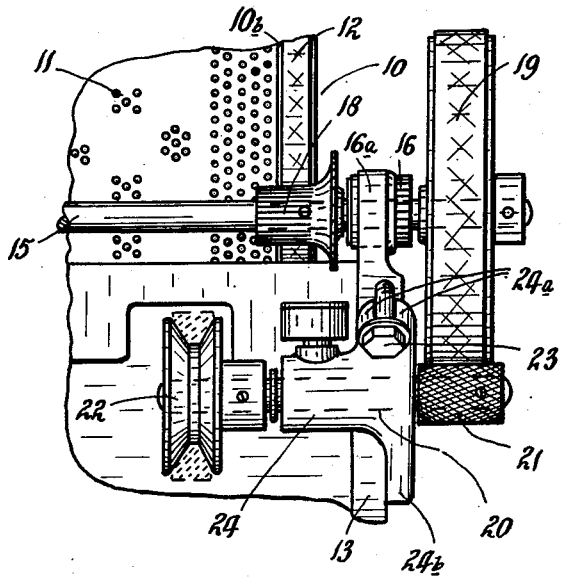
Figure 6:
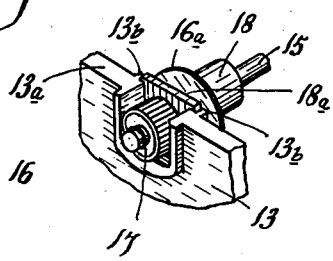
Figure 6 is a detail perspective view of the other bearing end of each drive spindle.

In the drawings suitable power means for this purpose are shown such means comprising the pulley 22 mounted upon the other end of the shaft 20 and adapted to be connected to an electrical motor through the V-belt drive indicated by the dashed cross-section of Figure 5. When the hand operated means are used, the machine may be caused to operate continuously the operator being free to place the eggs into the machine and to remove them through the opening of the drum ends.

Provision may be made in the mounting of the spindle 20 whereby the frictional contact between its roller 21 and the wheel 19 may be adjusted at will. For this purpose the said spindle is mounted in the journal 24 upon the end of a lever arm 24b pivoted upon a pin 25 which projects from the side of the end frame member 13 and such journal is provided with a lug 24a projecting outwardly and upwardly therefrom. A screw threaded stud 23 passes loosely through this lug inwardly and its head engages the lug while the stud screws into the end of the frame member 13 so that by the manipulation of the stud, the lever arm 24b may be moved inwardly to tension more or less the engagement of the roller 20 with the wheel in the required manner.

The trough 14 is provided with a draining sump 26 if liquid is used, for collecting and draining off the dirty liquid; the charging of the trough is effected by running water or liquid into it between the drum and the trough top, through the inlet pipe 27. A rotatable overflow pipe 28 is also provided so that the operator may decide upon the water level in the trough 14. If desired, the feeding of water into the trough, and the draining thereof from the trough may be carried out continuously, in order to maintain a clean supply and to carry away the dirt quickly. While a continuous flow of fresh water is desirable from a strictly hygienic point of view, from actual use of the machine it has been found that the eggs clean more quickly in a dirty water mainly due to the greater density of abrasive matter such as farm dirt particles suspended in the water.

If desired, and in order to prevent any liability of eggs falling out over the edge of the opening 10a should any excess quantity of eggs be placed in the drum or should the eggs bunch in a heap a guard plate 29 may be provided which plate is shaped to extend vertically and at a tangent across within the lower edge of the opening and to overlap it a distance. This plate is kept in position by forming its upper edge with a flange which rests on the top edge of the adjacent frame member 13 and is clamped thereon by means of the spring disc 30 affixed to the outer side of such frame member.

The machine parts are made of any suitable material or combination of materials.

In the use of this machine the drum is set rotating at a slow speed to dip into the water in the trough and eggs are passed in through its end opening or openings to lie upon its lower side and thereby to be rolled gently over and over by contact with one another and with the turning drum surface and thus to be cleaned, after which they may be removed by access through the drum end or ends.

I claim:

1. A machine for use in cleaning eggs, fruit or the like, comprising a shallow trough adapted to hold a supply of liquid the said trough having a spindle journalled in each of its edges to extend along the length thereof each spindle having a roller fixed thereon near each of its ends, a cylindrical drum formed with a perforated periphery and with an open end adapted to be rotatably supported along and within the trough by resting its periphery upon the said rollers, the drum periphery and one of the said rollers being formed with frictionally engaging surfaces, a driving spindle journalled upon the trough to extend parallel with the roller spindle in a bearing capable of being moved to cause the driving spindle to be adjusted in its distance away from the roller spindle, and friction wheels fixed upon the outer end of the driving spindle and upon the corresponding end of the adjacent roller spindle adapted to peripherally engage one with the other.

2. A machine for use in cleaning eggs, fruit or the like according to claim 1 in which a guard plate is fixed to the end of the said trough corresponding to the open end of the drum, to be positioned within the drum end to extend across the lower part of the drum opening.

3. A machine for use in cleaning eggs, fruit or the like according to claim 1 in which the said shallow trough is formed with a bottom downwardly curved transversely of its length and end frames shaped as stands between which the said bottom is fixed to extend horizontally.

4. A machine for use in cleaning eggs, fruit or the like, comprising a shallow trough adapted to hold a supply of liquid, the said trough having a spindle journalled in each of its edges to extend along the length thereof, each spindle having a roller fixed thereon near each of its ends, a cylindrical drum formed with a perforated periphery and with an open end adapted to be rotatably supported along and within the trough by resting its periphery upon the said rollers, the drum periphery and one of the said rollers being formed with frictionally engaging surfaces, a lever arm pivoted to one end of the trough to project out from the trough side, said arm having a sleeve formed upon its outer end extending parallel with the trough edge, a lug projecting radially from the said sleeve, a screw pin passing through such lug and engaged into the trough end, a driving spindle journalled in the said sleeve to extend parallel with the said roller spindle, and friction wheels fixed respectively upon the corresponding ends of the driving spindle and the roller spindle adapted to peripherally engage one with the other.

ALFRED HOLT.

REFERENCES CITED

The following references are of record in the file of this patent:

UNITED STATES PATENTS

| Number | Name | Date |
| --- | --- | --- |
| 929,804 | Thompson | Aug. 3, 1909 |
| 1,331,739 | Becker | Feb. 24, 1920 |
| 1,648,823 | Randall et al. | Nov. 8, 1927 |
| 2,018,157 | Urschel | Oct. 22, 1935 |

FOREIGN PATENTS

| Number | Country | Date |
| --- | --- | --- |
| 16,160 | Great Britain | Oct. 14, 1889 |